(12) United States Patent
Warita et al.

(10) Patent No.: US 11,697,750 B2
(45) Date of Patent: Jul. 11, 2023

(54) POLYURETHANE HOT-MELT ADHESIVE, LAMINATED BODY USING SAME, AND METHOD FOR PRODUCING LAMINATED BODY

(71) Applicant: KURARAY CO., LTD., Kurashiki (JP)

(72) Inventors: Masato Warita, Okayama (JP); Akihisa Iwamoto, Okayama (JP); Michinori Fujisawa, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 583 days.

(21) Appl. No.: 16/634,641

(22) PCT Filed: Jul. 24, 2018

(86) PCT No.: PCT/JP2018/027681
§ 371 (c)(1),
(2) Date: Jan. 28, 2020

(87) PCT Pub. No.: WO2019/031231
PCT Pub. Date: Feb. 14, 2019

(65) Prior Publication Data
US 2021/0130664 A1 May 6, 2021

(30) Foreign Application Priority Data

Aug. 10, 2017 (JP) .................. 2017-155665

(51) Int. Cl.
*C09J 175/08* (2006.01)
*C09J 7/10* (2018.01)
(Continued)

(52) U.S. Cl.
CPC ............. *C09J 175/08* (2013.01); *B32B 5/024* (2013.01); *B32B 5/026* (2013.01); *B32B 7/12* (2013.01);
(Continued)

(58) Field of Classification Search
CPC ...................................................... C09J 175/04
See application file for complete search history.

(56) References Cited

U.S. PATENT DOCUMENTS

2004/0072953 A1  4/2004  Hung et al.
2004/0198899 A1  10/2004  Hung et al.
(Continued)

FOREIGN PATENT DOCUMENTS

CN  1224746 A  8/1999
CN  101760143 A  6/2010
(Continued)

OTHER PUBLICATIONS

International Search Report dated Sep. 11, 2018 in PCT/JP2018/027681 filed Jul. 24, 2018, 2 pages.
Extended European Search Report dated Mar. 11, 2021 in European Patent Application No. 18843901.2, 10 pages.

*Primary Examiner* — Ian A Rummel
(74) *Attorney, Agent, or Firm* — Oblon, McClelland, Maier & Neustadt, L.L.P.

(57) ABSTRACT

Disclosed is a polyurethane hot-melt adhesive including: a thermoplastic polyurethane that is a reactant of a raw material including a polymer polyol, a polyisocyanate, and a chain extender, wherein X−Y≥15, where X represents a temperature (° C.) at which the polyurethane hot-melt adhesive has a melt viscosity of $2.0 \times 10^3$ Pa·s, and Y represents a temperature at which the polyurethane hot-melt adhesive has a melt viscosity of $1.0 \times 10^5$ Pa·s, and the polyurethane hot-melt adhesive has a 100% modulus of 2.5 MPa or more.

13 Claims, 1 Drawing Sheet

(51) Int. Cl.
- *C09J 7/35* (2018.01)
- *C08G 18/12* (2006.01)
- *C08G 18/48* (2006.01)
- *C08G 18/32* (2006.01)
- *C08G 18/76* (2006.01)
- *B32B 5/02* (2006.01)
- *B32B 7/12* (2006.01)
- *B32B 37/10* (2006.01)

(52) U.S. Cl.
CPC .............. *B32B 37/10* (2013.01); *C08G 18/12* (2013.01); *C08G 18/3206* (2013.01); *C08G 18/4808* (2013.01); *C08G 18/4845* (2013.01); *C08G 18/7657* (2013.01); *C09J 7/10* (2018.01); *C09J 7/35* (2018.01); *B32B 2309/12* (2013.01); *C08G 2170/20* (2013.01); *C09J 2475/00* (2013.01)

(56) References Cited

U.S. PATENT DOCUMENTS

| | | |
|---|---|---|
| 2005/0033004 A1 | 2/2005 | Hoffmann et al. |
| 2012/0123043 A1 | 5/2012 | Nakamura et al. |

FOREIGN PATENT DOCUMENTS

| | | |
|---|---|---|
| CN | 103102861 A | 5/2013 |
| CN | 103881595 A | 6/2014 |
| CN | 104479618 A | 4/2015 |
| CN | 106835732 A | 6/2017 |
| JP | 62-223285 A | 10/1987 |
| JP | 7-97560 A | 4/1995 |
| JP | 2005-126595 A | 5/2005 |
| JP | 2007-525546 A | 9/2007 |
| JP | 2009-280735 A | 12/2009 |
| JP | WO 2011/024917 A1 | 3/2011 |
| JP | 2012-82366 A | 4/2012 |
| JP | 2015-101699 A | 6/2015 |
| WO | WO 2016/182144 A1 | 11/2016 |

POLYURETHANE HOT-MELT ADHESIVE, LAMINATED BODY USING SAME, AND METHOD FOR PRODUCING LAMINATED BODY

TECHNICAL FIELD

The present invention relates to a polyurethane hot-melt adhesive, a laminated body in which two members are bonded using the same, and a method for producing the laminated body.

BACKGROUND ART

Polyurethane hot-melt adhesives are used for bonding sheet members to each other by hot pressing. Conventionally, polyurethane hot-melt adhesives have been designed to have a high temperature dependence of the melt viscosity such that they quickly melt upon reaching a predetermined temperature, and quickly solidify when the temperature decreases to a predetermined temperature or below.

For example, PTL 1 listed below discloses a heat adherent polyurethane film whose melt viscosity behavior is sensitive to temperatures, that has excellent low-temperature flexibility, and is also favorable in texture, chemical resistance, dry cleanability, heat resistance, and adhesion strength. Specifically, PTL 1 discloses a heat adherent polyurethane film composed mainly of a thermoplastic polyurethane obtained by reacting an aliphatic diisocyanate, an aromatic diisocyanate, a polymer diol, and a chain extender.

CITATION LIST

Patent Literature

[PTL 1] Japanese Laid-Open Patent Publication No. H7-97560

SUMMARY OF INVENTION

Technical Problem

It is an object of the present invention to provide a polyurethane hot-melt adhesive that has a wide temperature range selectable for achieving good bonding, and that can maintain the suppleness of an adhesive layer, while maintaining high adhesion.

Solution to Problem

An aspect of the present invention is directed to a polyurethane hot-melt adhesive including: a thermoplastic polyurethane that is a reactant of a raw material including a polymer polyol, a polyisocyanate, and a chain extender, wherein $X-Y \geq 15$, preferably $X-Y \geq 19$, where X represents a temperature (° C.) at which the polyurethane hot-melt adhesive has a melt viscosity of $2.0 \times 10^3$ Pa·s, and Y represents a temperature at which the polyurethane hot-melt adhesive has a melt viscosity of $1.0 \times 10^5$ Pa·s. Such a polyurethane hot-melt adhesive has a wide temperature range selectable for achieving good bonding. Therefore, for example, in the case of bonding by hot pressing a plurality of members having different thermal conductivities arranged on the surface of a base material with a polyurethane hot-melt adhesive interposed between each of the members and the surface, there is no significant difference in melt viscosity between the polyurethane hot-melt adhesives that respectively bond the members even if a temperature difference occurs between the polyurethane hot-melt adhesives. As a result, for example, when bonding the plurality of members having different thermal conductivities to the base material, the polyurethane hot-melt adhesives can easily permeate the base material. In addition, it is possible to maintain high adhesion after bonding.

It is preferable that the polymer polyol contains at least two polymer polyols whose number-average molecular weights are different by 1000 or more, because a polyurethane hot-melt adhesive that exhibits $X-Y \geq 15$ can be easily obtained.

It is preferable that the polymer polyol contains 60 mass % or more of polyether polyol, because a polyurethane hot-melt adhesive having high hydrolysis resistance and high adhesion to a polyether polyurethane can be easily obtained.

It is preferable that the polyurethane hot-melt adhesive has a 100% modulus of 2.5 to 6.0 MPa, because it is possible to maintain the suppleness of the adhesive layer while maintaining high adhesion.

It is preferable that the polyurethane hot-melt adhesive is a film, because of the excellent workability.

Another aspect of the present invention is directed to a laminated body in which at least two members that are bonded using any of the polyurethane hot-melt adhesives are laminated on a surface of a base material. For such a laminated body, the adhesion of the members can be sufficiently maintained even if there is a difference in thermal conductivity between the members. In particular, when the base material is a fiber structural body, and the two members are fiber structural bodies having woven/knitted structures that are different from each other, the adhesion of the members can be sufficiently maintained.

Another aspect of the present invention is directed to a method for producing a laminated body, including the steps of: forming a superposed body in which at least two sheet-like fiber structural bodies having woven/knitted structures that are different from each other are disposed on a surface of a base material via an adhesive; and hot pressing the superposed body, to form a laminated body, wherein the adhesive is one of the polyurethane hot-melt adhesives.

Advantageous Effects of Invention

According to the present invention, it is possible to obtain a polyurethane hot-melt adhesive that has a wide temperature range selectable for achieving good bonding, and that can also maintain high adhesion. With such a polyurethane hot-melt adhesive, for example, in the case of bonding by hot pressing a plurality of members having different thermal conductivities arranged on the surface of a base material, the polyurethane hot-melt adhesives that respectively bond the members can easily permeate the base material. In addition, it is possible to maintain high adhesion after bonding.

DESCRIPTION OF EMBODIMENT

A polyurethane hot-melt adhesive of the present embodiment is a polyurethane hot-melt adhesive including: a thermoplastic polyurethane that is a reactant of a raw material including a polymer polyol, a polyisocyanate, and a chain extender, wherein X−Y≥15, where X represents a temperature (° C.) at which the polyurethane hot-melt adhesive has a melt viscosity of $2.0 \times 10^3$ Pa·s, and Y represents a temperature at which the polyurethane hot-melt adhesive has a melt viscosity of $1.0 \times 10^5$ Pa·s.

The thermoplastic polyurethane is obtained by a conventionally known thermoplastic polyurethane polymerization method in which a raw material containing a polymer polyol, a polyisocyanate, and a chain extender is caused to undergo urethanation reaction. Examples of the polymerization method include bulk polymerization, solution polymerization, and aqueous dispersion polymerization. Among these, bulk polymerization is preferable because of the good volume reaction efficiency. For bulk polymerization, a prepolymer method or a one-shot method may be used. The prepolymer method is a method in which a polymer polyol and a polyisocyanate are reacted under appropriate reaction conditions (e.g., reacted at 80° C. for 4 hours), to produce a urethane prepolymer, and a chain extender is added to the urethane prepolymer, to polymerize a polyurethane. The one-shot method is a method in which a polymer polyol, a polyisocyanate, and a chain extender are simultaneously added and polymerized. Of these, the one-shot method is particularly preferable because a thermoplastic polyurethane that is industrially productive and has a wide molecular weight distribution is likely to be obtained.

The thermoplastic polyurethane is a polyurethane obtained by reacting a raw material including a bifunctional polymer polyol (polymer diol) that does not form a branching structure, a bifunctional polyisocyanate (diisocyanate), and a chain extender. Note that a tri- or higher-functional compound may be included as long as the thermoplasticity is not impaired.

The polymer polyol is a polyol having a number-average molecular weight of 200 or more, and a polyether polyol, a polycarbonate polyol, a polyester polyol or the like can be used without any particular limitation.

Specific examples of the polyether polyol include aliphatic polyether diols such as polyethylene glycol, polypropylene glycol, polybutylene glycol, and polytetramethylene glycol. These may be used alone or in a combination of two or more.

Specific examples of the polycarbonate polyol include polyhexamethylene carbonate diol, poly(3-methyl-1,5-pentylene carbonate)diol, polypentamethylene carbonate diol, and polytetramethylene carbonate diol. These may be used alone or in a combination of two or more.

Examples of the polyester polyol include polyols obtained by polycondensation of a low-molecular weight diol and dicarboxylic acid.

Specific examples of the low-molecular weight diol include ethylene glycol, butane diol, 1,2-propylene glycol, 1,3-propylene glycol, 1,3-butylene glycol, 1,4-butylene glycol, 2,2-dimethyl-1,3-propane diol, 1,6-hexane diol, 3-methyl-1,5-pentane diol, 1,8-octane diol, 1,4-bis(hydroxyethoxy)benzene, 1,3-bis(hydroxyisopropyl)benzene, diethylene glycol, triethylene glycol, dipropylene glycol, tripropylene glycol, cyclohexane-1,4-diol, cyclohexane-1,4-dimethanol, glycerin, trimethylol propane, trimethylol ethane, hexane triol, pentaerythritol, sorbitol, and methyl glycoside. These may be used alone or in a combination of two or more.

Specific examples of the dicarboxylic acid include adipic acid, sebacic acid, itaconic acid, maleic anhydride, terephthalic acid, and isophthalic acid. These may be used alone or in a combination of two or more.

Note that polyester polyurethanes have been widely used as commonly used polyurethane hot-melt adhesives, in consideration of the balance between the cost and the adhesion. However, polyester polyurethanes have low hydrolysis resistance, and adhesive layers formed thereby tend to be degraded over time though hydrolysis.

Additionally, aqueous emulsion-type polyurethanes with low environmental load are widely used for forming a grain layer and a surface coat layer of an artificial leather and a synthetic leather. The grain layer and the surface coat layer are required to have high hydrolysis resistance. Therefore, polyether polyurethanes for which a polyether polyol having high hydrolysis resistance is used as a polyol component are widely used as the aqueous emulsion-type polyurethanes. When a member is bonded to the surface of a polyether polyurethane using a polyester polyurethane hot-melt adhesive, it tends to be difficult to maintain high adhesion strength due to the differences in compatibility and polarity.

From the viewpoint of solving the above-described problems, the polymer polyol has a content ratio of the polyether polyol of preferably 60 mass % or more, more preferably 80 mass % or more, particularly preferably 90 mass % or more, quite particularly preferably 100 mass %. By using a polymer polyol containing 60 mass % or more of the polyether polyol, it is possible to obtain a thermoplastic polyurethane that is excellent in hydrolysis resistance, and also has excellent adhesion to the polyether polyurethane.

The number-average molecular weight of the polymer polyol is preferably 500 to 5000, more preferably 600 to 4500, particularly preferably 700 to 4000, because a thermoplastic polyurethane that is well-balanced in flexibility and mechanical properties can be obtained.

Specific examples of the polyisocyanate include aromatic diisocyanates such as phenylene diisocyanate, tolylene diisocyanate, 4,4'-diphenylmethane diisocyanate, 2,4'-diphenylmethane diisocyanate, naphthalene diisocyanate, and xylylene diisocyanate; aliphatic diisocyanates or alicyclic diisocyanates such as hexamethylene diisocyanate, lysine diisocyanate, cyclohexane diisocyanate, isophorone diisocyanate, dicyclohexylmethane diisocyanate, and tetramethylxylylene diisocyanate; and polymeric diphenylmethane diisocyanates such as dimers and trimers of 4,4'-diphenylmethane diisocyanate. These may be used alone or in a combination of two or more.

Examples of the chain extender include low-molecular weight compounds including, in the molecule, two active hydrogen atoms capable of reacting with an isocyanate group, and having a molecular weight of 400 or less, which have been conventionally used for production of polyurethanes.

Specific examples of the chain extender include diamine-based compounds such as hydrazine, ethylenediamine, propylenediamine, xylylenediamine, isophoronediamine, piperazine and derivatives thereof, phenylenediamine, tolylenediamine, xylenediamine, adipic acid dihydrazide, isophthalic acid dihydrazide, hexamethylenediamine, 4,4'-diaminophenylmethane, and 4,4'-dicyclohexylmethane diamine; diol-based compounds such as ethylene glycol, propylene glycol, 1,4-butane diol, 1,6-hexane diol, 1,4-cyclohexane diol, bis(β-hydroxyethyl)terephthalate, 3-methyl-1,5-pentane diol, cyclohexane diol, xylylene glycol, 1,4-bis(R-hydroxyethoxy)benzene, and neopentyl glycol; and amino alcohols such as amino ethyl alcohol and amino propyl alcohol. These may be used alone, or in a combination of two or more.

In addition to the chain extender, a monoamino compound such as ethylamine, n-propylamine, isopropylamine, n-butylamine, isobutylamine, t-butylamine, or cyclo hexylamine may be used in combination to control the molecular weight, or amino carboxylic acid such as ε-aminocaproic acid (6-amino hexanoic acid), γ-aminobutyric acid (4-amino butanoic acid), amino cyclohexane carboxylic acid, or aminobenzoic acid may be used in combination to introduce a carboxyl group at an end.

As for the mixing ratio of the polymer polyol, the chain extender, and the polyisocyanate, the isocyanate index, which is an equivalence ratio of the isocyanate group in the polyisocyanate and the active hydrogen groups contained in the polymer polyol and the chain extender, is preferably about 0.85 to 1.1, more preferably about 0.9 to 1.0. When the isocyanate index is in such a range, the thermoplastic polyurethane has an appropriate melting point, so that a polyurethane hot-melt adhesive that is excellent in processability, and is also excellent in adhesion strength due to the excellent mechanical properties is likely to be obtained.

The weight-average molecular weight of the thermoplastic polyurethane is not particularly limited, but is preferably 50,000 to 300,000, more preferably 80,000 to 200,000, because an appropriate melt viscosity is likely to be achieved.

As for the molecular weight distribution of the thermoplastic polyurethane, the polydispersity calculated from the ratio of the weight-average molecular weight and the number-average molecular weight is preferably 1.8 to 4.5, more preferably 2.0 to 4.0, particularly preferably 2.5 to 3.5, because this provides an appropriate temperature dependence of the melt viscosity.

The thermoplastic polyurethane may be the above-described thermoplastic polyurethane, or may be a polyurethane hot-melt adhesive composed mainly of the thermoplastic polyurethane with which an additive is mixed as needed. Specific examples of the additive include known antioxidants such as hindered amine-based and hindered phenol-based antioxidants, light resisting agents such as benzotriazole-based, benzophenone-based, and triazine-based light resisting agents, and colorants such as pigments and dyes.

In the polyurethane hot-melt adhesive, $X-Y \geq 15$, preferably $X-Y \geq 19$, more preferably $X-Y \geq 20$, particularly preferably X–Y 25, where X represents a temperature (° C.) at which the polyurethane hot-melt adhesive has a melt viscosity of $2.0 \times 10^3$ Pa·s, and Y represents a temperature at which the polyurethane hot-melt adhesive has a melt viscosity of $1.0 \times 10^5$ Pa·s. When the polyurethane hot-melt adhesive has such melt viscosity properties, it is possible to widen the temperature range for maintaining the melt viscosity within the range of $2.0 \times 10^3$ Pa·s to $1.0 \times 10^5$ Pa·s, which is suitable for heat bonding. Then, the range of selection for the temperature conditions for heat bonding using the polyurethane hot-melt adhesive is widened. Note that the upper limit of X–Y is not particularly limited, but is preferably $50 \geq X-Y$, more preferably $40 \geq X-Y$, because the solidification speed during cooling can be easily controlled.

The temperature X (° C.) at which the polyurethane hot-melt adhesive has a melt viscosity of $2.0 \times 10^3$ Pa·s is not particularly limited, but is preferably $X \geq 120$, more preferably $X \geq 135$. The temperature Y (° C.) at which the polyurethane hot-melt adhesive has a melt viscosity of $1.0 \times 10^5$ Pa·s is not also particularly limited, but is preferably $130 \geq Y$, more preferably $125 \geq Y$.

A polyurethane hot-melt adhesive having such melt viscosity properties can be prepared, for example, in the following manner.

For example, by using at least two polymer polyols whose number-average molecular weights are different from each other by preferably 1000 or more, more preferably 2000 or more, as the polymer polyols used for producing a thermoplastic polyurethane, it is possible to obtain a thermoplastic polyurethane having a wide molecular weight distribution, or in other words, having a high polydispersity. The wider the molecular weight distribution, the lower the temperature dependence of the melt viscosity is. The melt viscosity properties can also be controlled by adjusting the ratio of the soft segment and the hard segment through selection of the types and the ratio of the polymer polyol, the polyisocyanate, and the chain extender, or by controlling the reaction temperature and the reaction time. Furthermore, the aforementioned thermoplastic polyurethane can also be achieved using a polymer alloy obtained by mixing two or more thermoplastic polyurethanes having different melt viscosity properties.

The polyurethane hot-melt adhesive has a 100% modulus of 2.5 MPa or more. In terms of the well-balanced adhesion and suppleness, the 100% modulus is preferably 2.5 to 6.0 MPa, more preferably 2.8 to 5.5 MPa, particularly preferably 3.0 to 4.5 MPa. When the 100% modulus is less than 2.5 MPa, an adhesive layer formed by the polyurethane hot-melt adhesive is likely to undergo fracture, so that the adhesion strength becomes insufficient. When the 100% modulus is too high, the adhesive layer becomes hard. In particular, in the case of bonding a supple member such as a fiber member, the resulting laminated body tends to lack suppleness.

It is preferable that the polyurethane hot-melt adhesive is processed into a film for use. The thickness of the film is not limited, but is preferably about 20 to 300 μm, for example.

The polyurethane hot-melt adhesive of the present embodiment can be suitably used especially when a plurality of members formed by fiber structural bodies having different woven/knitted structures are laminated to a base material such as a knitted fabric, a woven fabric, a non-woven fabric, a suede-like or grain-like artificial leather, or a resin film. Note that a woven/knitted structure in the present embodiment means an element that causes a difference in the thermal conductivity of a member, such as an entangled structure determining whether a fabric is a non-woven fabric, a woven fabric, or a knitted fabric, a method of weaving or knitting, a basis weight, an apparent density, a fiber density, a fineness, a fiber raw material, or a thickness. Examples of the combination of a plurality of members formed by fiber structural bodies having different woven/knitted structures include combinations of members having different entangled structures such as a combination of a non-woven fabric and a woven fabric, a combination of a non-woven fabric and a knitted fabric, a combination of an artificial leather and a woven fabric, combinations of a member with a high basis weight and a member with a low basis weight, and combinations of a member with a high apparent density and a member with a low apparent density.

Figure 1:
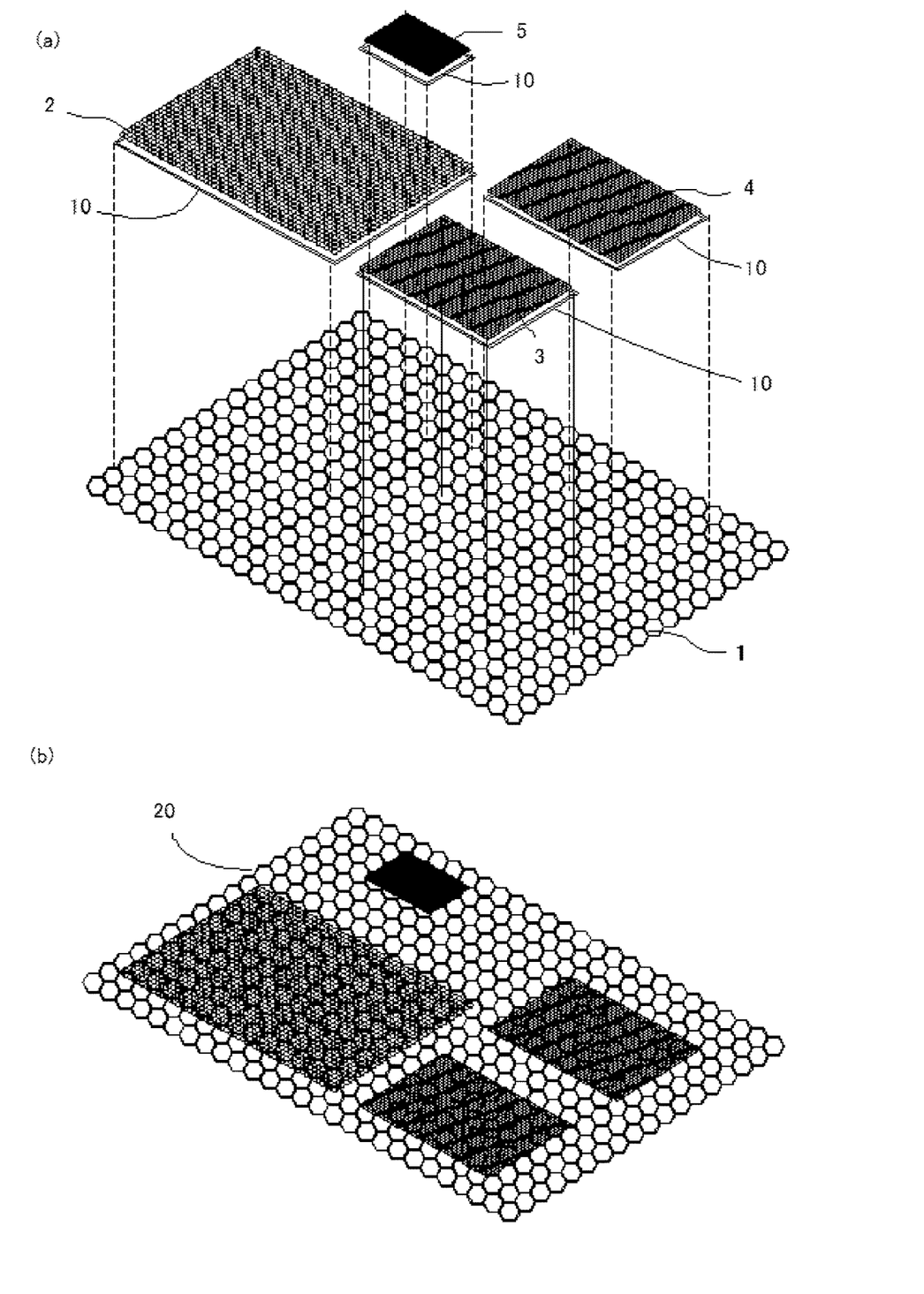
FIG. 1 is a schematic diagram illustrating a process in which a laminated body 20 is produced by bonding a member 2, a member 3, a member 4, and a member 5 having woven/knitted structures that are different from each other to the surface of a base material 1, which is a mesh knitted fabric, using films 10 of a polyurethane hot-melt adhesive according to an embodiment.

FIG. 1 is a schematic diagram illustrating a process in which a laminated body 20 is produced by bonding a member 2, a member 3, a member 4, and a member 5 having woven/knitted structures that are different from each other to the surface of a base material 1, which is a mesh knitted fabric, using films 10 of a polyurethane hot-melt adhesive according to an embodiment. The member 2, the member 3, the member 4, and the member 5 are fiber members having woven/knitted structures that are different from each other, and also have different thermal conductivities due to the woven/knitted structures that are different from each other. The member 2, the member 3, the member 4, and the member 5 are selected in the ascending order of fiber density, or in the descending order of thermal conductivity.

When a member is bonded to the surface of a base material via a polyurethane hot-melt adhesive (hereinafter may also be simply referred to as "adhesive"), the adhesive melts by the heat transferred from the member. A member having a high thermal conductivity transfers heat more quickly than a member having a low thermal conductivity, and is thus likely to increase the temperature of the adhesive. An adhesive having a high temperature is reduced in viscosity more significantly than an adhesive having a low temperature.

For example, a case will be described where a knitted fabric member (member 2) having the lowest fiber density and the largest number of voids, a non-woven fabric member (member 5) having the highest fiber density and the smallest number of voids, and other members (member 3, member 4) are bonded to the surface of a mesh knitted fabric 1, as shown in FIG. 1. In the case of bonding the members by hot pressing to the surface of the base material 1, which is a mesh knitted fabric, using films of a conventional adhesive, the adhesive that bonds the member 2 is reduced in viscosity as a result of melting by quickly undergoing temperature increase, because the member 2 has a higher thermal conductivity than the member 5. On the other hand, the adhesive that bonds the member 5 does not sufficiently melt because the adhesive is less likely to undergo temperature increase. As a result, the adhesive that bonds the member 2 can easily permeate the base material 1, and thus is likely to be increased in adhesion strength. On the other hand, the adhesive that bonds the member 5 becomes difficult to permeate the base material 1, and thus is likely to be reduced in adhesion strength.

As such, in the case of bonding a plurality of members having different thermal conductivities to a base material using a conventional adhesive, the adhesion strength of a member having a high thermal conductivity (member 2) is likely to increase, and the adhesion strength of a member (member 5) having a low thermal conductivity is likely to decrease. Accordingly, there may be a difference in adhesion strength among the plurality of members, or there may be a member that cannot be bonded. To solve such a problem, it is conceivable to control the hot pressing temperature. However, if the temperature dependence of the melt viscosity of the adhesive is high, it is difficult to achieve an improvement because the controllable temperature range is narrow.

On the other hand, when a film of the polyurethane hot-melt adhesive of the present embodiment that has low temperature dependence of the melt viscosity is used in place of a conventional adhesive in the above-described bonding process, the following bonding can be achieved. That is, in the polyurethane hot-melt adhesive of the present embodiment X−Y≥15, where X represents a temperature (° C.) at which the polyurethane hot-melt adhesive has a melt viscosity of $2.0 \times 10^3$ Pa·s, and Y represents a temperature at which the polyurethane hot-melt adhesive has a melt viscosity of $1.0 \times 10^5$ Pa·s, so that the temperature dependence of the melt viscosity is low. Therefore, the melt viscosity of the polyurethane hot-melt adhesive is less likely to significantly change depending on the temperature during bonding by hot pressing. Specifically, in the above-described example, the difference in melt viscosity between the polyurethane hot-melt adhesive that bonds the member 2 and the polyurethane hot-melt adhesive that bonds the member 5 does not become too significant. That is, the influence of the temperature difference between the polyurethane hot-melt adhesives due to the thermal conductivity difference between the members that are bonded thereby is less likely to be reflected on the melt viscosity difference. As a result, when the plurality of members having different thermal conductivities are bonded to the base material, the polyurethane hot-melt adhesives that respectively bond the members can be more easily caused to uniformly permeate the base material. In addition, the range of selections of the temperature conditions for hot pressing is also widened. A superposed body in which at least two fiber members having woven/knitted structures that are different from each other are disposed on the surface of a base material constituted by such a fiber structural body via an adhesive can be suitably used, for example, for production of the skin material of sneakers, and the like.

EXAMPLES

The present invention will be described more specifically by way of examples. It should be noted that the scope of the present invention is by no means construed to be limited to the following examples.

First, the evaluation methods used in the present examples will be collectively described.

Evaluation of Temperature X (° C.) and Temperature Y (° C.)

A melt viscosity measurement was carried out using CAPILOGRAPH 1C (capillary rheometer) (manufactured by Toyo Seiki Seisaku-sho, Ltd.). Specifically, a capillary with a diameter of 1 mm and a length of 10 mm was set at the bottom portion of a cylindrical chamber having an inner diameter of 9.55 mm and an effective length of 35 mm. Then, a predetermined amount of a ground polyurethane hot-melt adhesive was charged in the chamber heated at a predetermined temperature, to melt the polyurethane hot-melt adhesive. Then, the piston is advanced in the chamber at a shear rate in the range of 6.08/sec to 121.6/sec, and the melt viscosity was measured from the stress at that time. Then, from a chart of the shear rate dependence of the melt viscosity at various temperatures, the temperature (° C.) at which the melt viscosity at a shear rate of 12.1/sec was $2.0 \times 10^3$ Pa·s was determined as X, and the temperature (° C.) at which the melt viscosity at that shear rate was $1.0 \times 10^5$ Pa·s was determined as Y.

100% Modulus of Polyurethane Hot-Melt Adhesive

A film of a polyurethane hot-melt adhesive, having a width of 25 mm, a length of 15 cm, and a thickness of 100 μm, was produced. Then, the 100% modulus of the film was measured at a head speed of 100 mm/min, using a tensile tester (Tensilon, manufactured by ORIENTEC CORPORATION) compliant with JIS K 7311.

Temperature Range for Good Bonding

A napped artificial leather (suede-like artificial leather) having a size of a width of 25 mm and a length of 15 cm, a thickness of 1.0 mm, and an apparent density of 0.6 g/cm$^3$, and a double-raschel type mesh knitted fabric having the same size, a thickness of 3.0 mm, and an apparent density of 0.3 g/cm$^3$ were prepared. Then, the napped artificial leather and the mesh knitted fabric were heat-bonded, with a 100μ-thick film of a polyurethane hot-melt adhesive interposed therebetween, at a pressure of 6 kgf/cm$^2$ for a pressing time of 60 seconds, using a heated flat pressing machine set at temperatures from 80° C. to 160° C. at an interval of 5° C. Then, the whole was cooled at room temperature for one day, thus obtaining a laminated body. Then, the adhesion strength of the laminated body was measured using a tensile tester (Tensilon, manufactured by ORIENTEC CORPORATION). Then, the temperature range in which the adhesion strength of the laminated body was 2.5 kg/cm or more was determined, and that temperature range was used as a temperature range for good bonding.

Adhesion Strength Retention of Laminated Body after Heat Moisture Treatment

A superposed body was formed in which a 100 μm-thick film of a polyurethane hot-melt adhesive was interposed between pieces of a napped artificial leather, each having a size of a width of 25 mm and a length of 15 cm, a thickness of 1.0 mm, and an apparent density 0.6 g/cm$^3$. Then, the superposed body was hot-pressed at a pressure of 6 kgf/cm$^2$ for a pressing time of 60 seconds, using a heated flat pressing machine set at the temperature at which the highest adhesion strength was achieved in the above-described measurement of Temperature Range for Good Bonding of Fiber Structural Body, and, thereafter, the superposed body was allowed to stand at room temperature for one day, thus obtaining a laminated body. Then, the adhesion strength ($S_0$) of the laminated body was measured using a tensile tester (Tensilon, manufactured by ORIENTEC CORPORATION). Also, a laminated body that had been produced in the same manner was allowed to stand for three weeks in a constant-temperature and constant-humidity bath at a temperature of 70° C. and a relative humidity of 95%. Then, the laminated body was removed from the constant-temperature and constant-humidity bath, and the adhesion strength ($S_1$) thereof was measured in the same manner. Then, the adhesion strength retention (%) was determined from the expression: $S_1/S_0 \times 100$.

Adhesion Strength to Polyether Polyurethane

A grain-finished artificial leather was prepared that had an apparent density of 0.5 g/cm$^3$, a size of a width of 25 mm and a length of 15 cm, thickness of 1.0 mm and included a film of polyether polyurethane (RESAMINE ME-1085EA, manufactured by Dainichiseika Color & Chemicals Mfg. Co., Ltd.) as a grain layer. Then, grain layers of pieces of the grain-finished artificial leather were heat-bonded, with a 100 μm-thick film of each polyurethane hot-melt adhesive interposed therebetween, at a pressure of 6 kgf/cm$^2$ for a pressing time of 60 seconds, using a heated flat pressing machine set at the temperature at which the highest peel strength was achieved in the above-described measurement of Temperature Range for Good Bonding of Fiber Structural Body. Then, the whole was cooled at room temperature for one day, and, thereafter, the adhesion strength was measured using a tensile tester.

Softness (Stiffness)

The stiffness was measured using a softness tester (leather softness measuring instrument ST 300, manufactured by MSA Engineering Systems Limited of the United Kingdom). Specifically, a predetermined ring with a diameter of 25 mm was set on a lower holder of the instrument, and, thereafter, a laminated body having the same configuration as that of the laminated body formed for the above-described measurement of Temperature Range for Good Bonding of Fiber Structural Body was set on the lower holder. Then, a metal pin (diameter: 5 mm) fixed to an upper lever was pressed down toward the laminated body. Then, the upper lever was pressed down, the value at which the upper lever was locked was measured at five different locations, and the average value was read. Note that the values indicated the penetration depth, and a larger value indicated higher suppleness.

Example 1

Into a reaction vessel were charged 40 parts by mass of polypropylene glycol having a number-average molecular weight of 4000 (hereinafter also referred to as "PPG 4000", hydroxyl value: 28 mg KOH/g), 100 parts by mass of polypropylene glycol having a number-average molecular weight of 1000 (hereinafter also referred to as "PPG 1000", hydroxyl value: 112 mg KOH/g), 60 parts by mass of 4,4'-diphenylmethane diisocyanate (hereinafter also referred to as "MDI"), and 12.5 parts by mass of 1,4-butane diol (hereinafter also referred to as "1,4-BD") serving as a chain extender, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

TABLE 1

| Example No. | Ex. 1 | Ex. 2 | Ex. 3 | Ex. 4 | Ex. 5 | Ex. 6 | Ex. 7 | Ex. 8 | Ex. 9 | Com Ex. 1 | Com Ex. 2 |
|---|---|---|---|---|---|---|---|---|---|---|---|
| Polymer polyol (parts by mass) | | | | | | | | | | | |
| PPG 500 | — | — | 90 | — | — | 80 | 30 | — | — | — | — |
| PPG 1000 | 100 | 40 | — | 50 | 50 | — | — | 30 | — | — | 40 |
| PPG 2000 | — | — | — | 50 | — | 20 | — | — | — | — | — |
| PPG 3000 | — | — | 20 | — | 130 | — | — | — | — | 100 | 160 |
| PPG 4000 | 40 | 20 | — | — | — | — | 20 | 30 | — | — | — |
| PEPA 1000 | — | — | — | — | — | — | — | — | 100 | — | — |
| PEPA 2000 | — | 40 | — | — | — | — | — | 60 | — | — | — |
| PEPA 3000 | — | — | — | — | — | — | — | — | 60 | — | — |
| Polyether ratio in polyol (mass %) | 100 | 60 | 100 | 100 | 100 | 100 | 100 | 50 | 0 | 100 | 100 |
| Polyisocyanate (MDI, parts by mass) | 60 | 50 | 80 | 40 | 50 | 80 | 45 | 50 | 55 | 35 | 45 |
| Chain extender (1,4-BD, parts by mass) | 12.5 | 13.1 | 12.5 | 10 | 12 | 12.5 | 10 | 12.5 | 11.5 | 9.5 | 12 |
| 100% modulus (MPa) | 3.3 | 3.5 | 5.1 | 3.0 | 2.5 | 6.0 | 7.2 | 3.9 | 3.1 | 3.2 | 2.0 |
| Temperature X | 136 | 141 | 147 | 123 | 124 | 151 | 155 | 135 | 135 | 128 | 124 |

TABLE 1-continued

| Example No. | Ex. 1 | Ex. 2 | Ex. 3 | Ex. 4 | Ex. 5 | Ex. 6 | Ex. 7 | Ex. 8 | Ex. 9 | Com Ex. 1 | Com Ex. 2 |
|---|---|---|---|---|---|---|---|---|---|---|---|
| (° C.) Temperature Y (° C.) | 111 | 118 | 125 | 108 | 105 | 130 | 134 | 113 | 113 | 115 | 101 |
| X-Y (° C.) | 25 | 23 | 22 | 15 | 19 | 21 | 21 | 22 | 22 | 13 | 23 |
| Temperature range for good bonding (° C.) | 25 (115-140) | 20 (120-140) | 25 (120-145) | 15 (110-125) | 20 (110-130) | 20 (130-150) | 20 (130-150) | 20 (115-135) | 20 (115-135) | 10 (115-125) | No favorable condition (adhesive layer fractured) |
| Adhesion strength retention of laminated sample after heat moisture treatment (%) | 99 | 90 | 98 | 97 | 97 | 98 | 97 | 74 | 48 | 99 | 99 |
| Adhesion strength to polyether polyurethane (kg/cm) | 4.5 | 3.3 | 4.3 | 4.1 | 3.8 | 4.6 | 4.5 | 2.4 | 1.5 | 4.1 | 1.9 |
| Softness (mm) | 2.3 | 2.4 | 2.4 | 2.3 | 2.3 | 2.0 | 1.6 | 2.2 | 2.0 | 2.3 | 2.7 |

Example 2

Into a reaction vessel were charged 20 parts by mass of PPG 4000, 40 parts by mass of PPG 1000, 40 parts by mass of polyethylene propylene adipate having a number-average molecular weight of 2000 (hereinafter also referred to as "PEPA 2000", hydroxyl value: 56 mg KOH/g), 50 parts by mass of MDI, and 13.1 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

Example 3

Into a reaction vessel were charged 20 parts by mass of polypropylene glycol having a number-average molecular weight of 3000 (hereinafter also referred to as "PPG 3000", hydroxyl value: 37 mg KOH/g), 90 parts by mass of polypropylene glycol having a number-average molecular weight of 500 (hereinafter also referred to as "PPG 500", hydroxyl value: 223 mg KOH/g), 80 parts by mass of MDI, and 12.5 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

Example 4

Into a reaction vessel were charged 50 parts by mass of polypropylene glycol having a number-average molecular weight of 2000 (hereinafter also referred to as "PPG 2000", hydroxyl value: 56 mg KOH/g), 50 parts of PPG 1000, 40 parts by mass of MDI, and 10 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

Example 5

Into a reaction vessel were charged 130 parts by mass of PPG 3000, 50 parts by mass of PPG 1000, 50 parts by mass of MDI, and 12 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

Example 6

Into a reaction vessel were charged 20 parts by mass of PPG 2000, 80 parts by mass of PPG 500, 80 parts by mass of MDI, and 12.5 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

Example 7

Into a reaction vessel were charged 20 parts by mass of PPG 4000, 30 parts by mass of PPG 500, 45 parts by mass of MDI, and 10 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

Example 8

Into a reaction vessel were charged 30 parts by mass of PPG 4000, 30 parts by mass of PPG 1000, 60 parts by mass of PEPA 2000, 50 parts by mass of MDI, and 12.5 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

Example 9

Into a reaction vessel were charged 60 parts by mass of polyethylene propylene adipate having a number-average molecular weight of 3000 (referred to as "PEPA 3000", hydroxyl value: 37 mg KOH/g), 100 parts by mass of polyethylene propylene adipate having a number-average molecular weight of 1000 (referred to as "PEPA 1000", hydroxyl value: 112 mg KOH/g), 55 parts by mass of MDI, and 11.5 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

Comparative Example 1

Into a reaction vessel were charged 100 parts by mass of PPG 3000, 35 parts by mass of MDI, and 9.5 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

Comparative Example 2

Into a reaction vessel were charged 160 parts by mass of PPG 3000, 40 parts by mass of PPG 1000, 45 parts by mass of MDI, and 12 parts by mass of 1,4-BD, and the whole was heated for 3 hours at 140° C., to obtain a thermoplastic polyurethane in the form of a block. Then, the obtained thermoplastic polyurethane was ground, and a 100 μm-thick film of a polyurethane hot-melt adhesive was formed by T-die melt extrusion molding. Then, using the obtained polyurethane hot-melt adhesive, evaluation was made according to the above-described evaluation methods. The results are shown in Table 1.

The results in Table 1 show that each of the polyurethane hot-melt adhesives obtained in Examples 1 to 9 had an increased temperature range in which the adhesion strength was maintained at 2.5 kg or more. The polyurethane hot-melt adhesives obtained in Examples 1 to 7, in which the polyether polyol in the polymer polyol was 60 mass % or more, also had high hydrolysis resistance and high adhesion to the polyether polyurethane sheet. On the other hand, the polyurethane hot-melt adhesive obtained in Comparative Example 1, in which X−Y was less than 15, had high temperature dependence of the melt viscosity, and thus had a narrow temperature range in which the adhesion strength was maintained at 2.5 kg or more. In the case of the polyurethane hot-melt adhesive obtained in Comparative Example 2, which had a 100% modulus of 2.0 MPa, the adhesive layer easily underwent cohesive failure, and thus had low adhesion strength.

REFERENCE SIGNS LIST

1 . . . . Base material 2, 3, 4, 5 . . . . Member

10 . . . . Film of polyurethane hot-melt adhesive

The invention claimed is:

1. A polyurethane hot-melt adhesive, comprising:
a thermoplastic polyurethane that is a reactant of a raw material comprising a polymer polyol, a polyisocyanate, and a chain extender,
wherein the polymer polyol comprises at least two polymer polyols whose number-average molecular weights are different by 1000 or more,
the polyurethane hot-melt adhesive satisfies X-Y≥15, where X represents a temperature (° C.) at which the polyurethane hot-melt adhesive has a melt viscosity of $2.0 \times 10^3$ Pa·s, and Y represents a temperature at which the polyurethane hot-melt adhesive has a melt viscosity of $1.0 \times 10^5$ Pa·s, and
the polyurethane hot-melt adhesive has a 100% modulus of 2.5 MPa or more.

2. The polyurethane hot-melt adhesive according to claim 1, wherein X-Y≥19.

3. The polyurethane hot-melt adhesive according to claim 1, wherein X≥135, and 130≥Y.

4. The polyurethane hot-melt adhesive according to claim 1, wherein the number-average molecular weights of the at least two polymer polyols are different by 2500 or more.

5. The polyurethane hot-melt adhesive according to claim 1,
wherein the polymer polyol comprises 60 mass % or more of polyether polyol.

6. The polyurethane hot-melt adhesive according to claim 1,
wherein the polyurethane hot-melt adhesive has a 100% modulus of 2.5 to 6.0 MPa.

7. The polyurethane hot-melt adhesive according to claim 1,
wherein the chain extender comprises at least one low-molecular weight diol selected from the group consisting of hydrazine, ethylenediamine, propylenediamine, xylylenediamine, isophoronediamine, piperazine and derivatives thereof, phenylenediamine, tolylenediamine, xylenediamine, adipic acid dihydrazide, isophthalic acid dihydrazide, hexamethylenediamine, 4,4'-diaminophenylmethane, 4,4'-dicyclohexylmethane diamine, ethylene glycol, propylene glycol, 1,4-butane diol, 1,6-hexane diol, 1,4-cyclohexane diol, bis(β-hydroxyethyl)terephthalate, 3-methyl-1,5-pentane diol, cyclohexane diol, xylylene glycol, 1,4-bis(β-hydroxyethoxy)benzene, neopentyl glycol, amino ethyl alcohol, and amino propyl alcohol.

8. The polyurethane hot-melt adhesive according to claim 1,
wherein the chain extender comprises 1,4-butane diol.

9. The polyurethane hot-melt adhesive according to claim 1,
wherein an equivalence ratio of the isocyanate group in the polyisocyanate and the active hydrogen groups contained in the polymer polyol and the chain extender is from 0.85 to 1.1.

10. The polyurethane hot-melt adhesive according to claim 1,
wherein the polyurethane hot-melt adhesive is a film.

11. A laminated body in which at least two members that are bonded using the polyurethane hot-melt adhesive according to claim 1 are laminated on a surface of a base material.

12. The laminated body according to claim 11,
wherein the base material is a fiber structural body, and
the two members are fiber structural bodies having woven/knitted structures that are different from each other.

13. A method for producing a laminated body, the method comprising:
forming a superposed body in which at least two sheet-like fiber structural bodies having woven/knitted structures that are different from each other are disposed on a surface of a base material via an adhesive; and
hot pressing the superposed body, to form a laminated body,
wherein the adhesive is the polyurethane hot-melt adhesive according to claim 1.

* * * * *